(12) United States Patent
Tinch et al.

(10) Patent No.: US 7,397,985 B2
(45) Date of Patent: *Jul. 8, 2008

(54) HIGH-POWER FUSED COLLIMATOR AND ASSOCIATED METHODS

(75) Inventors: David A. Tinch, Orlando, FL (US); Bruce E. Bernacki, Kennewick, WA (US); K. Brent Binkley, Lake Mary, FL (US)

(73) Assignee: Lightpath Technologies, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/566,755

(22) Filed: Dec. 5, 2006

(65) Prior Publication Data

US 2007/0196046 A1   Aug. 23, 2007

Related U.S. Application Data

(63) Continuation of application No. 11/244,303, filed on Oct. 5, 2005, now Pat. No. 7,146,075.

(51) Int. Cl.
   *G02B 6/32* (2006.01)
(52) U.S. Cl. .............................. 385/33; 385/34; 385/43; 156/272.8; 156/273.3
(58) Field of Classification Search .................. None
   See application file for complete search history.

(56) References Cited

U.S. PATENT DOCUMENTS

| | | | |
|---|---|---|---|
| 4,962,988 A | 10/1990 | Swann | |
| 6,019,522 A | 2/2000 | Kim | |
| 6,033,515 A | 3/2000 | Walters et al. | |
| 6,059,462 A | 5/2000 | Finak et al. | |
| 6,142,678 A | 11/2000 | Cheng | |
| 6,168,319 B1 | 1/2001 | Francis | |
| 6,217,698 B1 | 4/2001 | Walters et al. | |
| 6,352,376 B2 | 3/2002 | Walters et al. | |
| 6,360,039 B1 | 3/2002 | Bernard et al. | |
| 6,424,765 B1 | 7/2002 | Harker | |
| 6,540,411 B1 | 4/2003 | Cheng | |
| 6,563,975 B2 | 5/2003 | Towery | |
| 6,603,906 B2 | 8/2003 | Qin et al. | |
| 6,674,942 B2 | 1/2004 | Chang et al. | |
| 6,714,703 B2 | 3/2004 | Lee et al. | |
| 6,758,611 B1 | 7/2004 | Levin et al. | |
| 6,758,935 B2 | 7/2004 | Bernard et al. | |

(Continued)

*Primary Examiner*—Hemang Sanghavi
(74) *Attorney, Agent, or Firm*—Allen, Dyer, Doppelt, Milbrath, & Gilchrist, P.A.

(57) ABSTRACT

A method for making a high-power fused collimator, and a fused collimator made thereby, are provided. A fused collimator is provided that includes an end of a stripped end portion of an optical fiber fused to a proximal face of a silica lens. In an embodiment, a joint formed by the fiber end and the silica lens proximal face is substantially surrounded with a solder glass in a melted form. A cross-sectional area of the solder glass decreases proximally from a distal edge adjacent the lens to a proximal edge located along the fiber's stripped end portion. The solder glass is permitted to harden, forming a fused collimator. In another embodiment, a ferrule surrounds the fiber stripped end portion, and an adhesive is applied to the ferrule's proximal face to surround the fiber. The lens-ferrule joint is surrounded with solder glass, which is then surrounded with a silica sleeve.

12 Claims, 2 Drawing Sheets

U.S. PATENT DOCUMENTS

| | | |
|---|---|---|
| 6,780,274 B2 | 8/2004 | Bernard et al. |
| 6,798,943 B2 | 9/2004 | Towery |
| 6,804,435 B2 | 10/2004 | Robilliard et al. |
| 6,820,445 B2 | 11/2004 | Gratrix |
| 6,826,213 B1 | 11/2004 | Edwards et al. |
| 6,837,625 B2 | 1/2005 | Schott et al. |
| 6,865,333 B2 | 3/2005 | Porter et al. |
| 7,146,075 B2 * | 12/2006 | Tinch et al. ............ 385/33 |
| 2003/0179992 A1 | 9/2003 | Robilliard et al. |
| 2003/0235372 A1 | 12/2003 | Schott et al. |
| 2004/0146245 A1 | 7/2004 | Harwit |
| 2004/0175073 A1 | 9/2004 | Grinderslev et al. |
| 2004/0208443 A1 | 10/2004 | Burkhard et al. |
| 2005/0058411 A1 | 3/2005 | Finot et al. |
| 2005/0152644 A1 * | 7/2005 | Barefoot et al. ............ 385/33 |

* cited by examiner

HIGH-POWER FUSED COLLIMATOR AND ASSOCIATED METHODS

CROSS-REFERENCE TO RELATED APPLICATIONS

This application claims priority to application Ser. No. 11/244,303, filed Oct. 5, 2005, now U.S. Pat. No. 7,146,075, issued on Dec. 5, 2006, which itself claimed priority to provisional application Ser. No. 60/616,765, filed Oct. 6, 2004, entitled "High Power Fused Collimator."

BACKGROUND OF THE INVENTION

1. Field of the Invention

The present invention relates to optical systems, and, more particularly, to collimators wherein an optical fiber is fused directly to a lens.

2. Description of Related Art

The use of fiber lasers in industrial cutting and welding applications has grown, owing to the ever-increasing power output provided by laser manufacturers. This increase in power levels has created a need for collimators that can perform without performance degradation or failure under these conditions.

Standard collimator packages are limited in their power handling owing to the air space between the fiber and the lens. These collimator packages require both angle-polished fibers and lenses to prevent back-reflection to the source. Additionally, both these surfaces require anti-reflection coatings. While current technology provides low-reflection coatings (<0.25% per surface), at power levels approaching 100 W, there would still be 0.5 W reflected back into the system, owing to this interface.

This problem is further compounded by the fact that standard collimator packages use epoxy as the bonding mechanism for the fiber. Laser energy reflected back into the collimator from other sources such as the workpiece, aside from that owing to the air space, causes the epoxy to heat up. The high expansion of the epoxy can cause performance degradation as the epoxy expands and pulls the fiber with it. Additionally, even the highest-temperature epoxies can only handle less than 300° C. for any sustained period. Beyond that, the epoxy degrades and may burn off, causing catastrophic failure of the collimator.

The reflections caused at the air space interface can be eliminated through the use of a fused collimator. In a fused collimator the optical fiber is fused directly to a fused silica lens. This configuration eliminates the need to angle polish and coat the fiber and lens. The fusion allows the laser energy to pass from the fiber into the lens with less than −70 dB back-reflection.

For higher-power applications, however, the standard fused collimator package is insufficient. The fusion joint between the fiber and the pellet is strain-relieved using a high-temperature epoxy. As discussed above, reflections caused by the operating environment can heat the epoxy above its recommended use temperature, causing performance drift or catastrophic failure of the fusion joint.

Therefore, it would be desirable to provide a way of either eliminating or moving the epoxy strain relief away from the fusion joint.

SUMMARY OF THE INVENTION

The present invention is directed to a method for making a high-power fused collimator, and to a fused collimator made thereby. One aspect of the method comprises the step of providing a fused collimator comprising an end of a stripped end portion of an optical fiber fused to a proximal face of a silica lens. In some embodiments, a substantially toroidal element having an aperture therethrough is positioned adjacent the lens proximal face, so that the aperture is in surrounding relation to the fiber end.

A joint formed by the fiber end and the lens proximal face is then substantially surrounded with a solder glass in a melted form. A cross-sectional area of the solder glass decreases proximally from a distal edge adjacent the lens to a proximal edge located along the fiber's stripped end portion. Then the solder glass is permitted to harden, forming a fused collimator useful, for example, for high-power applications.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
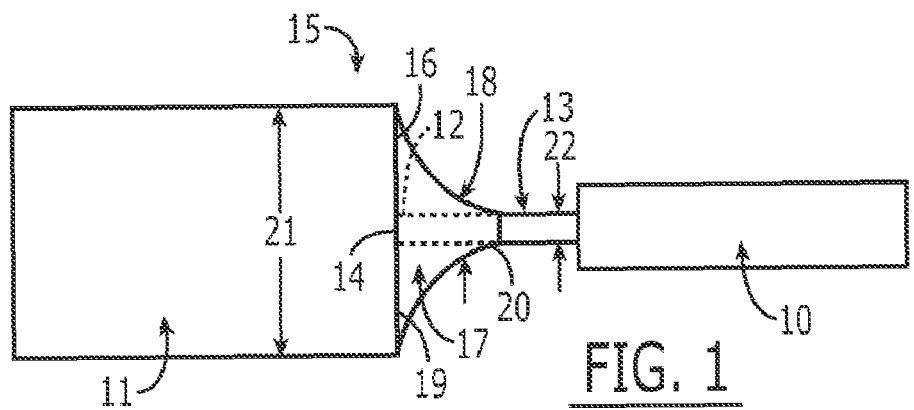
FIG. 1 is a side cross-sectional view of a first embodiment of fused collimator.
Figure 2:
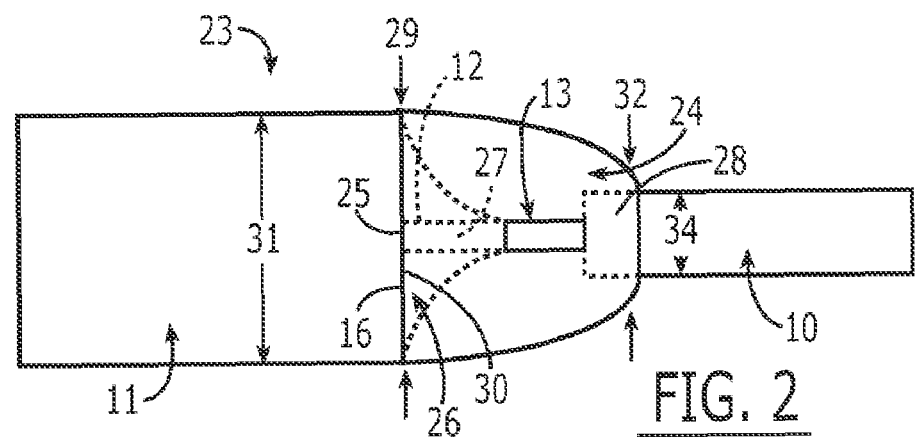
FIG. 2 is a side cross-sectional view of a second embodiment of a fused collimator.
Figure 3:
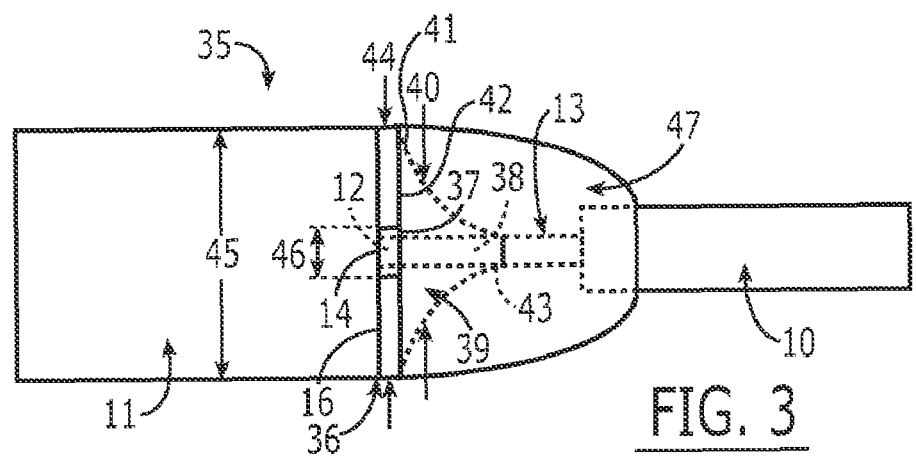
FIG. 3 is a side cross-sectional view of a third embodiment of a fused collimator.
Figure 4:
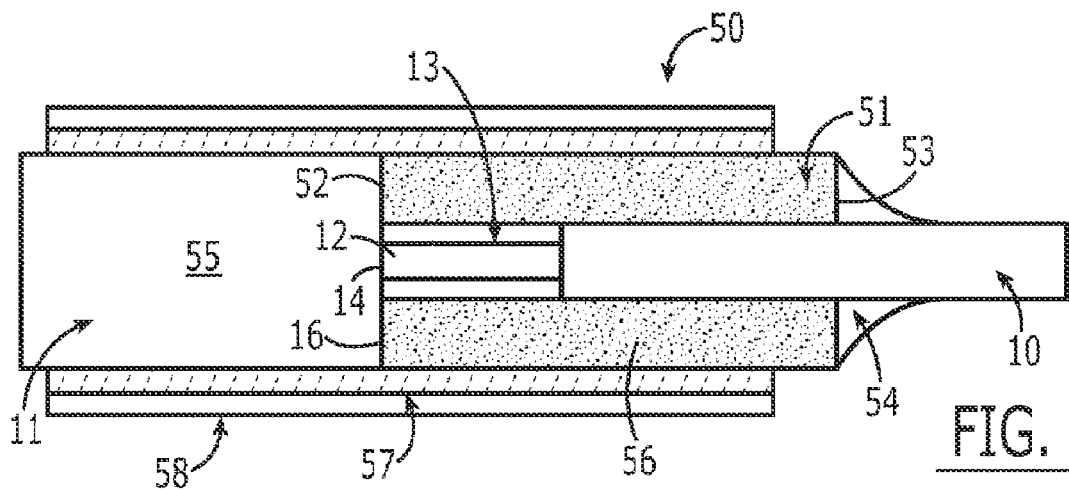
FIG. 4 is a side cross-sectional view of a fourth embodiment of a fused collimator.

A description of the preferred embodiments of the present invention will now be presented with reference to FIGS. 1-6.

In all the embodiments to be discussed in the present invention, a coated optical fiber 10 is directly fused to a lens/pellet 11 at a distal end 12 of a stripped end portion 13 of the fiber 10. Also in all embodiments a solder glass is used, for example, at or adjacent the fusion joint 14, which preferably comprises a low-melting-temperature glass frit that is supplied in either a paste or sintered preform, although this is not intended as a limitation. The solder glass material can be either optically transparent or opaque, depending upon the application. Although the melting temperature of the solder glass is significantly lower than the melting temperature of the silica lens 11, it still has a higher melting temperature than any known available epoxies. Additionally, the thermal expansion coefficient of the solder glass is much lower than the epoxy counterpart, providing a better material expansion match at the interface.

Two sets of embodiments are presented herein: a first set (FIGS. 1-3) comprises a solder glass as a replacement for the epoxy strain relief known in the art at the fusion joint 14; a second set (FIGS. 4-6) comprises a fused silica sleeve and ferrule in which the fused collimator resides.

In a first embodiment of a fused collimator 15 (FIG. 1), the joint 14 formed by the fiber distal end 12 and the lens's proximal face 16 is substantially surrounded with a solder glass 17 in a melted form, a cross-sectional area 18 of the solder glass 17 decreasing proximally from a distal edge 19 adjacent the lens 11 to a proximal edge 20 located along the fiber's stripped end portion 13. The solder glass 17 is permitted to harden, and serves as a strain relief to the joint 14.

In a particular embodiment, the cross-sectional area 18 of the solder glass 17 at the distal edge 19 is substantially equal to a cross-sectional area 21 of the lens's proximal face 16, and the cross-sectional area 18 of the solder glass 17 at the proximal edge 20 is substantially equal to a cross-sectional area 22 of the fiber's stripped end portion 13. More particularly, the solder glass 17 can form a slightly concave truncated pyramidal structure.

In a second embodiment (FIG. 2), a fused collimator 23 is formed as above, but a further step includes applying an epoxy overcoat 24 to the joint 25 in covering relation to the solder glass 26. Preferably the epoxy comprises a high-temperature epoxy, which serves to provide additional mechanical strength to the fiber's stripped end portion 13. In a particular embodiment, the epoxy overcoat 24 is applied in covering relation to the fiber's stripped end portion 13 and to a distal section 27 of a coated section 28 of the fiber 10. Preferably, the epoxy overcoat 24 has a cross-sectional area 29 at a distal edge 30 that is substantially equal to a cross-sectional area 31 of the lens's proximal face 16 and a cross-sectional area 32 at a proximal edge 33 that is greater than a cross-sectional area 34 of the fiber's coated distal section 27.

In a third embodiment (FIG. 3), a fused collimator 35 is formed by positioning a washer 36 having an aperture 37 therethrough adjacent the lens's proximal face 16, with the aperture 37 in surrounding relation to the fiber's distal end 12. Then a distal portion 38 of the fiber's stripped end portion 13 is substantially surrounded with a solder glass 39 in a melted form. Preferably, a cross-sectional area 40 of the solder glass 39 decreases proximally from a distal edge 41 adjacent a proximal face 42 of the washer 36 to a proximal edge 43 located along the fiber's stripped end portion 13.

The washer 36 preferably has a cross-sectional area 44 that is substantially equal to a cross-sectional area 45 of the lens 11, and can comprise either an opaque or a reflective material. Preferably the washer's aperture 37 has in inner diameter 46 that can encompass the fiber's stripped end portion 13, but is otherwise as small as possible. In a particular embodiment, an opaque washer 37, which absorbs reflected radiation, comprises 99% alumina ($Al_2O_3$) having a 0.250-mm thickness. This is not intended as a limitation, and another refractory ceramic material can be used. If a reflective material is used, radiation is reflected back in a forward direction.

In a particular embodiment, an epoxy overcoat 47 can be applied to the joint 14 in covering relation to the solder glass 39.

In a fourth embodiment (FIG. 4), a fused collimator 50 is formed by substantially surrounding the fiber's stripped end portion 13 with a ferrule 51, such as a fused silica ferrule, which serves to protect this portion of the stripped fiber from bending. A distal face 52 of the ferrule 51 is positioned adjacent the lens's proximal face 16, and a proximal face 53 of the ferrule 51 is positioned proximal of the fiber's stripped end portion 13. An adhesive, for example, epoxy 54, is applied to the ferrule's proximal face 53 in surrounding relation to the fiber 10, which provides strain relief at this junction, which is preferably at least 5 mm away from the fusion joint 14.

A proximal portion 55 of the lens 11 and a distal portion 56 of the ferrule 51 are substantially surrounded with a solder glass inner casing 57, which can comprise, for example, a glass solder paste. This glass bonding is believed to confer an advantage over epoxy bonding of these components, since the epoxy has a much lower operating temperature. Failure of prior art devices using epoxy in this region can lead to performance drift of the collimator.

The solder glass inner casing 57 is then substantially surrounded with a silica sleeve outer casing 58, which serves to retain the lens 11 and ferrule 51 in alignment.

In a fifth embodiment (FIG. 5), a fused collimator 60 is formed by positioning a washer 61 having an aperture 62 therethrough adjacent the lens's proximal face 16, with the aperture 62 in surrounding relation to the fiber's distal end 12. As above, the washer 61 can be either opaque or reflective, and the washer 61 serves to absorb or reflect any returned energy, preventing it from reaching the epoxy region of the assembly 60. The remaining elements of the embodiment 60 are similar to those of the collimator 50 of FIG. 4, with washer 61 interposed between the lens's proximal face 16 and a distal face 63 of the ferrule 64.

Figure 5:
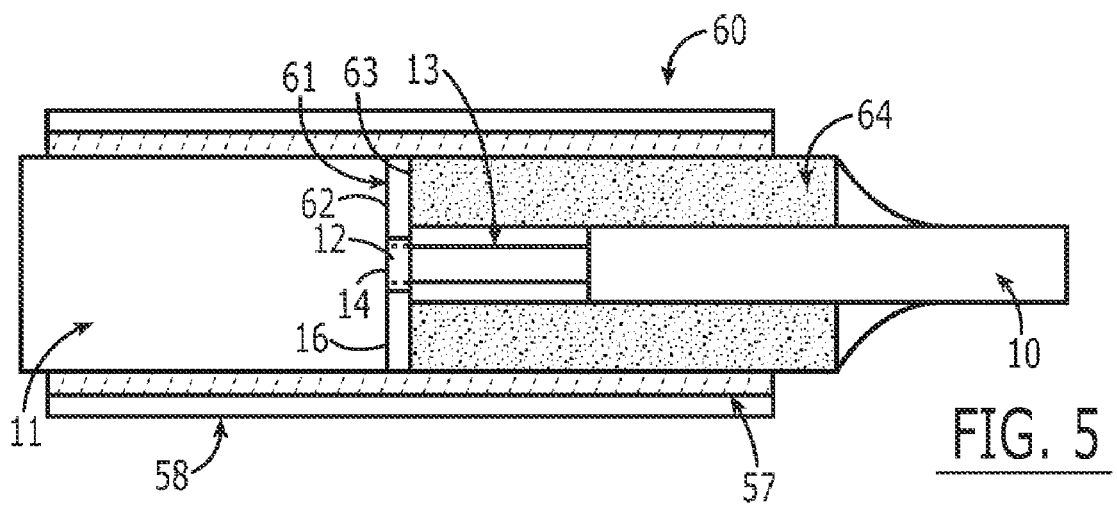
FIG. 5 is a side cross-sectional view of a fifth embodiment of a fused collimator.
Figure 6:
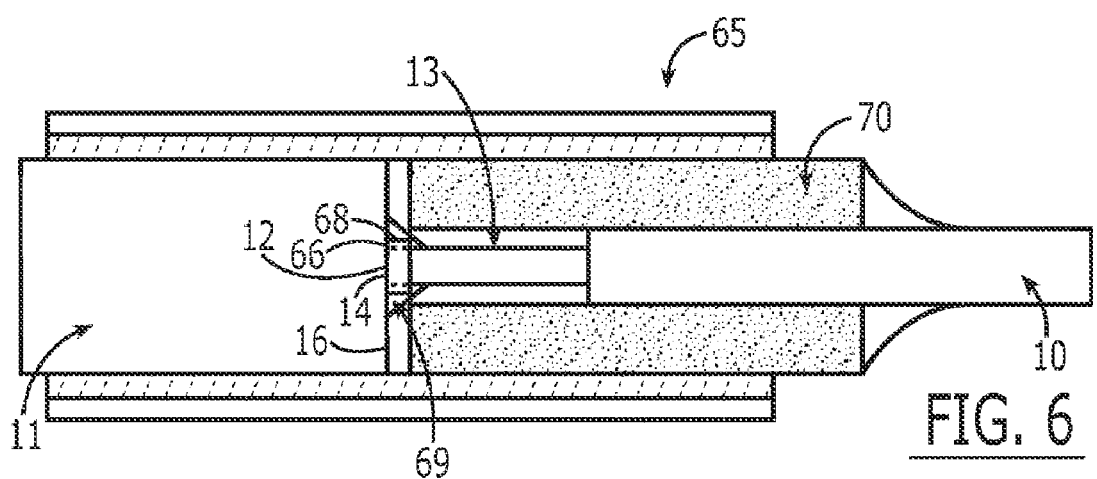
FIG. 6 is a side cross-sectional view of a sixth embodiment of a fused collimator.

In a sixth embodiment (FIG. 6), a fused collimator 65 is formed as above in FIG. 5, with the additional step that a space 66 between an inner face 67 of the washer's aperture 68 and the fiber end 12 with a solder glass reinforcement 69. This feature provides additional mechanical strength, and increases the protection of the epoxy at the ferrule 70/fiber 10 interface since the washer's aperture 68 is filled with solder glass 69.

It will be understood by one of skill in the art that a multitude of embodiments may be contemplated without departing from the spirit of the invention, including the use of different materials for the elements of the device and different configurations.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the device illustrated and described herein are by way of example, and the scope of the invention is not limited to the exact details of construction or use.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method for making a high-power fused collimator comprising the steps of:
   providing a fused collimator comprising an end of a stripped end portion of an optical fiber fused to a proximal face of a silica lens;
   substantially surrounding a distal portion of the fiber stripped end portion with a solder glass in a melted form, a cross-sectional area of the solder glass decreasing proximally from a distal edge adjacent the silica lens proximal face to a proximal edge located along the fiber stripped end portion; and
   permitting the solder glass to harden.

2. The method recited in claim 1, further comprising the step of applying an epoxy overcoat to the joint in covering relation to the solder glass.

3. The method recited in claim 2, wherein the epoxy overcoat is applied in covering relation to the stripped end portion of the fiber and to a distal section of a coated section of the fiber.

4. The method recited in claim 3, wherein the epoxy overcoat has a cross-sectional area at a distal edge substantially equal to a cross-sectional area of the lens proximal face and a cross-sectional area at a proximal edge greater than a cross-sectional area of the distal section of the coated section of the fiber.

5. The method recited in claim 1, wherein the cross-sectional area of the solder glass at the distal edge is substantially equal to a cross-sectional area of the lens proximal face and the cross-sectional area of the solder glass at the proximal edge is substantially equal to a cross-sectional area of the fiber stripped end portion.

6. A method for making a high-power fused collimator comprising the steps of:
   providing a fused collimator comprising an end of a stripped end portion of an optical fiber fused to a proximal face of a silica lens;
   substantially surrounding the fiber stripped end portion proximal of the silica lens proximal face with a ferrule, a distal face thereof adjacent the silica lens proximal face;
   applying an adhesive to a proximal face of the ferrule in surrounding relation to the fiber;
   surrounding a proximal portion of the lens and a distal portion of the ferrule with a solder glass inner casing; and
   substantially surrounding the solder glass inner casing with a silica sleeve outer casing.

7. A high-power fused collimator comprising:
   a fused collimator comprising a silica lens and an optical fiber having a stripped end portion having an end fused to a proximal face of the silica lens;
   a solder glass positioned in substantially surrounding relation to a distal portion of the fiber stripped end portion, a cross-sectional area of the solder glass decreasing proximally from a distal edge adjacent the silica lens proximal face to a proximal edge located along the fiber stripped end portion.

8. The high-power fused collimator recited in claim 7, further comprising an epoxy overcoat applied to the joint in covering relation to the solder glass.

9. The high-power fused collimator recited in claim 8, wherein the epoxy overcoat is positioned in covering relation to the stripped end portion of the fiber and to a distal section of a coated section of the fiber.

10. The high-power fused collimator recited in claim 9, wherein the epoxy overcoat has a cross-sectional area at a distal edge substantially equal to a cross-sectional area of the lens proximal face and a cross-sectional area at a proximal edge greater than a cross-sectional area of the distal section of the coated section of the fiber.

11. The high-power fused collimator recited in claim 10, wherein the cross-sectional area of the solder glass at the distal edge is substantially equal to a cross-sectional area of the lens proximal face and the cross-sectional area of the solder glass at the proximal edge is substantially equal to a cross-sectional area of the fiber stripped end portion.

12. A high-power fused collimator comprising:
   a fused collimator comprising a silica lens and an optical fiber having a stripped end portion having an end fused to a proximal face of the silica lens;
   a ferrule positioned in substantially surrounding relation to the fiber stripped end portion proximal of the silica lens proximal face, a distal face thereof adjacent the silica lens proximal face;
   applying an adhesive to a proximal face of the ferrule in surrounding relation to the fiber;
   surrounding a proximal portion of the lens and a distal portion of the ferrule with a solder glass inner casing; and
   substantially surrounding the solder glass inner casing with a silica sleeve outer casing.

* * * * *